United States Patent [19]

Cifuentes et al.

[11] Patent Number: 5,776,614
[45] Date of Patent: Jul. 7, 1998

[54] SILICONE PRESSURE SENSITIVE ADHESIVE COMPOSITIONS

[75] Inventors: Martin Eric Cifuentes; William Neal Fenton, both of Midland, Mich.

[73] Assignee: Dow Corning Corporation, Midland, Mich.

[21] Appl. No.: 822,896

[22] Filed: Mar. 27, 1997

[51] Int. Cl.$^6$ .............................. C09J 183/04; B32B 9/04
[52] U.S. Cl. .......................... 428/447; 428/448; 528/24; 528/21; 525/477; 524/322; 524/284; 524/251
[58] Field of Search ..................... 525/477; 524/322, 524/284, 251; 528/24, 21; 428/447, 448

[56] References Cited

U.S. PATENT DOCUMENTS

| | | | |
|---|---|---|---|
| 2,676,182 | 4/1954 | Daudt et al. | 260/448.2 |
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,627,851 | 12/1971 | Brady | 260/825 |
| 3,772,247 | 11/1973 | Flannigan | 260/46.5 |
| 4,831,070 | 5/1989 | McInally et al. | 524/267 |
| 4,988,779 | 1/1991 | Medford et al. | 525/478 |
| 5,248,739 | 9/1993 | Schmidt et al. | 525/477 |
| 5,665,805 | 9/1997 | Hatanaka et al. | 524/322 |

FOREIGN PATENT DOCUMENTS

| | | | |
|---|---|---|---|
| 0459292 A2 | 5/1991 | European Pat. Off. | C09J 183/04 |
| 998232 | 8/1963 | United Kingdom . | |
| 998232 | 7/1965 | United Kingdom . | |
| 2301829 | 12/1996 | United Kingdom | C08L 83/04 |

Primary Examiner—Margaret W. Glass
Attorney, Agent, or Firm—Timothy J. Troy

[57] ABSTRACT

This invention relates to pressure sensitive adhesive compositions which are obtained by a method comprising reacting a mixture comprising at least one polydiorganosiloxane, at least one silicone resin copolymer, at least one solvent or plasticizer selected from the group consisting of carboxylic acids having at least six carbon atoms and having a boiling point of at least 200°C, and amines having at least 9 carbon atoms and having a boiling point of at least 200°C, to form a reaction product, and then adding an organic peroxide or azo compound to the resultant reaction product. The silicone pressure sensitive adhesives of this invention are useful in preparing articles such as pressure sensitive tapes, labels, emblems and other decorative or informational signs.

30 Claims, No Drawings

SILICONE PRESSURE SENSITIVE ADHESIVE COMPOSITIONS

BACKGROUND OF THE INVENTION

This invention relates to silicone pressure sensitive adhesive compositions. More particularly this invention relates to pressure sensitive adhesive compositions obtained by reacting a mixture comprising a polydiorganosiloxane, a silicone resin copolymer, and at least one solvent or plasticizer selected from the group consisting of carboxylic acids having at least six carbon atoms and having a boiling point of at least 200° C. and amines having at least 9 carbon atoms and having a boiling point of at least 200° C. to form a reaction product, and then adding an organic peroxide or azo compound to the reaction product.

Silicone pressure sensitive adhesives (PSA's) are typically produced by either blending or condensing together a silicone resin and a silicone polymer. These types of silicone pressure sensitive adhesives have been disclosed for example in U.S. Pat. Nos. 2,736,721, 2,814,601, 2,857,356, and 3,528,940.

Silicone pressure sensitive adhesives which are produced by adding an amine or a salt of an amine to the silicone resin-silicone polymer blend have been disclosed for example in Great Britain Patent Specification No. 998,232. Silicone pressure sensitive adhesives have also been disclosed which comprise a resin, a polydiorganosiloxane fluid, and a condensation catalyst such as a metal salt of a carboxylic acid for example in U.S. Pat. No. 4,831,070.

European Patent Application No. 0459292 discloses a silicone pressure sensitive adhesive composition comprising a mixture two different pressure sensitive adhesive compositions containing resin and polymer blends.

U.S. Pat. No. 5,248,739 to Schmidt et al. discloses a silicone pressure sensitive adhesive composition produced by mixing together a silicone resin and a polydiorganosiloxane polymer and that these compositions can further comprise an organic peroxide as a crosslinking agent when the polydiorganosiloxane polymer does not contain unsaturated groups.

Great Britain Patent Publication No. 2301829 discloses silicone pressure sensitive adhesive compositions comprising 100 parts of an organopolysiloxane having a viscosity of at least 500,000 centipoise at 250° C., 60 to 300 parts of a silicone MQ resin, and 20 to 2500 parts of a linear or cyclic volatile organosiloxane fluid having a boiling point in the range of about 95° C. to about 250° C. where the organo radicals of the silicone PSA composition are selected from $C_{1-13}$ organo radicals which are attached to silicon by carbon-silicon linkages and further discloses that the curing of the silicone PSA composition is by the use of a free-radical initiator such as an organic peroxide.

Conventional peroxide curable silicone pressure sensitive adhesives are typically supplied at 55 to 60% solids by weight in an organic (typically aromatic) solvent diluent. This is done to lower the viscosity of the film forming product, making it easier to handle and apply evenly to a desired substrate.

SUMMARY OF THE INVENTION

It has now been discovered that the addition of certain high boiling point solvents or plasticizers to silicone pressure sensitive adhesive composition can improve the performance of the adhesive and eliminates the need for a separate silanol condensation catalyst.

This invention relates to silicone pressure sensitive adhesive compositions which are obtained by reacting a mixture comprising at least one polydiorganosiloxane, at least one silicone resin copolymer, and at least one solvent or plasticizer selected from the group consisting of carboxylic acids having at least six carbon atoms and having a boiling point of at least 200° C. and amines having at least 9 carbon atoms and having a boiling point of at least 200° C. to form a reaction product, and then adding an organic peroxide or azo compound to the reaction product.

It is an object of this invention to provide a silicone pressure sensitive adhesive that exhibits high tack while retaining good peel adhesion.

It is further an object of this invention to provide a silicone pressure sensitive adhesive that is produced without the need for a separate silanol condensation catalyst.

It is further an object of this invention to provide a silicone pressure sensitive adhesive having a high solids content which maintains excellent adhesive properties at low viscosities.

It is another object of this invention to provide a silicone pressure sensitive adhesive which will be particularly suitable in adhesive tape constructions.

DETAILED DESCRIPTION OF THE INVENTION

This invention relates to a silicone pressure sensitive adhesive composition obtained by a method comprising the steps of (I) reacting a mixture comprising: (A)(i) at least one hydroxyl-terminated polydiorganosiloxane having a viscosity of from 100 to 100,000,000 mm$^2$/s at 25° C. or (ii) a mixture of (a) a hydroxyl-terminated polydiorganosiloxane and (b) a polydiorganosiloxane selected from (i) polydiorganosiloxanes terminated with monovalent hydrocarbon radicals free of aliphatic unsaturation or (ii) alkenyl-terminated polydiorganosiloxanes wherein said mixture has a viscosity of from 100 to 100,000,000 mm$^2$/s at 25° C., (B) at least one soluble silicone resin consisting essentially of at least one $R_3SiO_{1/2}$ unit and at least one $SiO_{4/2}$ unit, wherein R is independently selected from a monovalent hydrocarbon or halohydrocarbon radical free of aliphatic unsaturation and having from 1 to 20 carbon atoms, an alkenyl radical, or a hydroxyl radical wherein the molar ratio of $R_3SiO_{1/2}$ units to $SiO_{4/2}$ units is from 0.5:1 to 1.2:1, and (C) at least one solvent or plasticizer selected from the group consisting of carboxylic acids having at least six carbon atoms and having a boiling point of at least 200° C. and amines having at least 9 carbon atoms and having a boiling point of at least 200° C. to form a reaction product, and (II) adding (D) an organic peroxide or azo compound to the reaction product of (I).

The hydroxyl-terminated polydiorganosiloxane of component (A) is preferably a polydiorganosiloxane having the general formula $HOR^1_2SiO(R^1_2SiO)_aSiR^1_2OH$ wherein each $R^1$ is independently selected from a monovalent hydrocarbon or halohydrocarbon radical having from 1 to 20 carbon atoms or an alkenyl radical. The monovalent hydrocarbon radicals free of aliphatic unsaturation include alkyl radicals exemplified by methyl, ethyl, propyl, pentyl, octyl, undecyl or octadecyl, cycloaliphatic radicals exemplified by cyclohexyl, aryl radicals exemplified by phenyl, tolyl, xylyl, benzyl or 2-phenylethyl, and chlorinated hydrocarbon radicals exemplified by 3-chloropropyl and dichlorophenyl. The alkenyl radicals include vinyl, allyl, butenyl, hexenyl, cyclohexenyl and beta-cyclohexenylethyl. Preferably $R^1$ is selected from methyl, phenyl, or vinyl. Preferably the hydroxyl-terminated polydiorganosiloxane of component (A) is a compound in which at least 50%, and preferably at least 85%, of the $R^1$ radicals are methyl radicals.

The average value of subscript "a" above is such that it provides a viscosity at 25° C. of about 100 mm²/s (100 centistokes) to about 100,000,000 mm²/s (100,000,000 centistokes), the viscosity being a function of the $R^1$ radicals on the polymer. It is especially preferred that the average value of a is such that it provides an organopolysiloxane component (A) having a viscosity in the range of 1,000 to 50,000,000 mm²/s at 25° C., and it is highly preferred that a has a value such that the viscosity of component (A) ranges from 2,000 to 500,000 mm²/s when measured at 25° C.

Specific examples of these polydiorganosiloxanes include, but are not limited to, $HOMe_2SiO(Me_2SiO)_aSiMe_2OH$, $HOMe_2SiO(Me_2SiO)_{0.94a}(Ph_2SiO)_{0.06a}SiMe_2OH$, $HOPh_2SiO(Me_2SiO)_{0.94a}(Ph_2SiO)_{0.06a}SiPh_2OH$, $HOMe_2SiO(Me_2SiO)_{0.95a}(MeViSiO)_{0.05a}SiMe_2OH$, $HOVi_2SiO(Me_2SiO)_{0.95a}(MeViSiO)_{0.05a}SiVi_2OH$, or $HOR_2SiO(Me_2SiO)_{0.88a}(Ph_2SiO)_{0.12a}SiR_2OH$ wherein Me, Vi, and Ph hereinafter denote methyl, vinyl, and phenyl, respectively, and a is as defined above. Component (i) can also be a mixture of two or more different hydroxyl-terminated polydiorganosiloxanes.

Component (A) can also be (ii) a mixture of (a) a hydroxyl-terminated polydiorganosiloxane and (b) a polydiorganosiloxane selected from (i) polydiorganosiloxanes terminated with monovalent hydrocarbon radicals free of aliphatic unsaturation or (ii) alkenyl-terminated polydiorganosiloxanes wherein said mixture has a viscosity of from 100 to 100,000,000 mm²/s at 25° C. The hydroxyl-terminated polydiorganosiloxane is as described above including preferred embodiments thereof. The monovalent hydrocarbon radicals free of aliphatic unsaturation and the alkenyl radicals are as described above including preferred embodiments thereof.

Specific examples of polydiorganosiloxanes terminated with monovalent hydrocarbon radicals free of aliphatic unsaturation include, but are not limited to, $Me_3SiO(Me_2SiO)_aSiMe_3$, $Me_3SiO(Me_2SiO)_{0.95a}(MeViSiO)_{0.05a}SiMe_3$, $Me_3SiO(Me_2SiO)_{0.5a}(MePhSiO)_{0.5a}SiMe_3$, or $Me_3SiO(Me_2SiO)_{0.5a}(Ph_2SiO)_{0.5a}SiMe_3$ wherein a has an average value as defined above.

Specific examples of polydiorganosiloxanes terminated with alkenyl radicals include, but are not limited to, $ViMe_2SiO(Me_2SiO)_aSiMe_2Vi$, $ViMe_2SiO(Me_2SiO)_{0.95a}(MePhSiO)_{0.05a}SiMe_2Vi$, $ViMe_2SiO(Me_2SiO)^{0.98a}(MeViSiO)_{0.02a}SiMe_2Vi$, $PhMeViSiO(Me_2SiO)_aSiPhMeVi$, $ViMe_2SiO(Me_2SiO)_{0.95a}(Ph2SiO)_{0.05a}SiMe_2Vi$, $PhMeViSiO(Me_2SiO)_{0.8a}(MePhSiO)_{0.1a}(Ph_2SiO)_{0.1a}SiPhMeVi$, wherein a has an average value as defined above.

If component (A) is (ii) a mixture of (a) and (b) as defined above, the mixture of (a) and (b) can be in weight ratios of (a):(b) of 1:99 to 99:1, is preferably from 90:10 to 10:90 and it is highly preferred that the weight ratio of (a) to (b) is from 70:30 to 30:70.

In component (A) it is also preferred that the molar sum of phenyl and vinyl radicals should not exceed 30% of the silicon atoms. In addition, component (A) can comprise trace amounts of siloxane branching sites, such as $R^1SiO_{3/2}$ units and $SiO_{4/2}$ units, provided that the component remains flowable. Component (A) is well known in the art and can be prepared by known methods.

The amount of component (A) in the compositions of this invention is preferably from about 30 parts by weight to about 50 parts by weight, and more preferably from about 37 parts by weight to about 47 parts by weight per 100 parts by weight of components (A)+(B).

Component (B) of this invention is at least one soluble silicone resin consisting essentially of at least one $R_3SiO_{1/2}$ unit (M unit) and at least one $SiO_{4/2}$ unit (Q unit), wherein R is independently selected from a monovalent hydrocarbon or halohydrocarbon radical having 1 to 20 carbon atoms, an alkenyl radical, or a hydroxyl group, all of which are as described above. By the term "soluble" it is meant that the silicone resin (B) can be dispersed, substantially completely, in either a hydrocarbon liquid exemplified by benzene, toluene, xylene, heptane and the like or in a silicone liquid such as cyclic or linear polydiorganosiloxanes. Preferably the resin is soluble in component (A), delineated hereinabove. Preferably the silicone resin of component (B) is a soluble hydroxy-functional organopolysiloxane resin consisting essentially of M units and Q units. In the hydroxyl functional organopolysiloxane resin the $R_3SiO_{1/2}$ units are bonded to the $SiO_{4/2}$ units, each of the latter being bonded to at least one other $SiO_{4/2}$ unit. Some of the $SiO_{4/2}$ units are bonded to hydroxy radicals resulting in $HOSiO_{3/2}$ units, thereby accounting for the silicon-bonded hydroxyl content of the resin. In addition, the resin may contain a small amount of a low molecular weight material comprised substantially of a neopentamer organopolysiloxane having the formula $(R_3SiO)_4Si$.

It is preferable that the hydroxy-content of the silicone resin or resin mixture as determined by $^{29}Si$ NMR (nuclear magnetic resonance) ranges from 1.0 wt % to 5.0 wt % based on the resin solids content, and preferably 1.5 wt % to 3.5 wt %. However, resins having less than 1.0 wt % hydroxy can be used in this invention.

In the formula for organopolysiloxane resin (B), the monovalent hydrocarbon radicals free of aliphatic unsaturation and the alkenyl radicals are as defined above, including preferred embodiments thereof. Preferably R is independently selected from methyl, phenyl, vinyl, or hydroxyl. Preferably, at least one-third, and more preferably substantially all R radicals in the formula for component (B) are methyl radicals. Examples of preferred $R_3SiO_{1/2}$ units include $Me_3SiO_{1/2}$, $ViMe_2SiO_{1/2}$, $PhMe_2SiO_{1/2}$, or $Ph_2MeSiO_{1/2}$.

The molar ratio of $R_3SiO_{1/2}$ units to $SiO_{4/2}$ units is 0.5:1 to 1.2:1. It is more preferred that the molar ratio of the $R_3SiO_{1/2}$ units to $SiO_{4/2}$ units be between 0.6:1 and 1:1. The above M:Q molar ratios can be easily obtained by $^{29}Si$ NMR. It is preferred that component (B) have a number average molecular weight (Mn) of about 3,000 to 7,500 when measured by gel permeation chromatography (GPC) calibrated against fractionated MQ resin standards. It is especially preferred that the molecular weight of Component (B) is from 3,500 to 6,000.

Component (B) can be prepared by well known methods. It is preferably prepared by the silica hydrosol capping process of U.S. Pat. No. 2,676,182 to Daudt et al., as modified by U.S. Pat. No. 3,627,851 to Brady, and U.S. Pat. No. 3,772,247 to Flannigan, each patent being incorporated herein by reference to teach how to prepare soluble organopolysiloxanes which are useful in this invention. Further, component (B) can be prepared by the cohydrolysis of a trialkyl hydrolyzable silane and alkyl silicate as described in U.S. Pat. No. 2,857,356, to Goodwin herein incorporated by reference for its teaching of how to prepare the resin.

The amount of component (B) in the compositions of this invention is preferably from about 50 parts by weight to about 70 parts by weight, and more preferably from about 53 parts by weight to about 63 parts by weight per 100 parts by weight of components (A)+(B). A preferred embodiment is the addition of a separate high-resin containing polymer-resin mixture to the initial resin-polymer mixture such that the resin content of the proportion of the combined resin and polymer mixture falls within the limits delineated above.

Component (C) is at least one solvent or plasticizer selected from the group consisting of carboxylic acids having at least six carbon atoms and having a boiling point of at least 200° C. and amines having at least 9 carbon atoms and having a boiling point of at least 200° C. The term "boiling point"0 for the purposes of this invention denotes the boiling point of a liquid at 760 mm of Hg. The carboxylic acids are exemplified by nonanoic acid, caproic acid, caprylic acid, oleic acid, linoleic acid, linolenic acid, and N-coco-beta-aminobutyric acid. The amines are exemplified by dodecylamine, hexadecylamine, octadecylamine, dimethyldodecylamine, dicocoamine, methyldicocoamine, dimethyl cocoamine, dimethyltetradecylamine, dimethylhexadecylamine, dimethyloctadecylamine, dimethyl tallow amine, dimethylsoyaamine, dimethyl nonylamine, di(hydrogenated-tallow)amine, and methyldi(hydrogenated-tallow)amine. Component (C) can also be a combination of two or more different carboxylic acids as described above, a combination of two or more different amines as described above, or a combination of a carboxylic acid as described above and an amine as described above. The materials of component (C) are unique in that they can act both as a catalyst and as a solvent in the silicone pressure sensitive adhesive compositions of this invention (i.e. they perform dual function) thus eliminating the need for employing a silanol condensation catalyst.

It is preferred that the amine or carboxylic acid of component (C) have a boiling point of at least 210° C., and it is especially preferred that the amine or carboxylic acid of (C) have a boiling point of at least 225° C. It is preferred that component (C) is miscible in components (A) and (B). Miscible as used herein denotes that Component (C) has the ability to dissolve uniformly in the mixture of (A)+(B).

The amount of component (C) to be used is dependent on the type of amine or carboxylic acid selected. If an amine or carboxylic acid having a boiling point near 200° C. is selected, a greater amount of amine or carboxylic acid is required. The amount of component (C) in the compositions of this invention is preferably from about 2 parts by weight to about 40 parts by weight, and more preferably from about 5 parts by weight to about 30 parts by weight per 100 parts by weight of components (A)+(B).

The mixture of step (I) can also further comprise (E) at least one solvent or plasticizer having a boiling point of at least 200° C. selected from the group consisting of aliphatic hydrocarbons, glycol ethers, esters, alcohols, ester alcohols, ketones, kerosenes, naphthas, and petrolatums. The aliphatic hydrocarbons are exemplified by dodecane (boiling point (bp) of about 216° C.), tridecane (bp of about 234° C.), tetradecane (bp of about 252° C.), 1-tetradecene (bp of about 256° C.), pentadecane (bp of about 266° C.), hexadecane (bp of about 280° C.), octadecane (bp of about 308° C.), and nonadecane (bp of about 320° C.). The glycol ethers are exemplified by diethylene glycol ethyl ether (bp of about 202° C.), diethylene glycol butyl ether (bp of about 230° C.), triethylene glycol methyl ether (bp of about 242° C.), triethylene glycol ethyl ether (bp of about 254° C.), triethylene glycol butyl ether (bp of about 283° C.), ethylene glycol phenyl ether (bp of about 245° C.), propylene glycol phenyl ether (bp of about 243° C.), and aromatic based glycol ethers (bp of about 245° C.). The esters are exemplified by diethylene glycol butyl ether acetate (bp of at least 235° C.), pine oil (bp of at least 212° C.), and mineral seal oil (bp of at least 278° C.). The alcohols are exemplified by tridecyl alcohol (bp of about 252° C.), and the ester alcohols are exemplified by trimethyl pentane diol isobutyrate (bp of at least 244° C.). The ketones exemplified by isophorone (bp of at least 215° C.). It is preferred that component (E), if present, is miscible in components (A) and (B). Miscible as used herein denotes that Component (E) has the ability to dissolve uniformly in the mixture of (A)+(B).

The amount of component (E) to be used is dependent on the type of solvent or plasticizer selected. If the material selected for component (E) has a boiling point near 200° C., a greater amount of solvent or plasticizer is required. The amount of component (E) in the compositions of this invention is preferably from about 2 parts by weight to about 40 parts by weight, and more preferably from about 5 parts by weight to about 30 parts by weight per 100 parts by weight of components (A)+(B).

The mixture of step (I) can also further comprise a rare earth metal salt of a fatty acid. Examples of rare earth metals suitable for forming the salt include cerium, lanthanum, praseodymium, with cerium being preferred. The fatty acid generally contains about 6 to 18 carbon atoms, most preferably about 8 carbon atoms. The preferred rare earth metal salt is cerium octoate. The rare earth metal salt is generally used in the compositions of this invention to provide the composition with an amount of rare earth metal within the range of from about 1 to about 1000 parts by weight, and preferably from about 10 to about 250 parts by weight per one million parts by weight of components (A)+(B). Typically, the rare earth metal salt if used is in the form of a 30% solvent solution, 6% of which is composed of the active rare earth metal. Solvents suitable for the rare earth metal solution are solvents having a boiling point of less than 200° C. such as hexane, heptane, toluene, xylene, naphtha, mineral spirits, or ketones.

The reaction product of step (I) is made by reacting a mixture of components (A), (B), and (C). Reacting for the purposes of this invention denotes simply mixing components (A), (B), and (C), and any optional components at room temperature (about 25° C.) or heating a mixture of components (A)–(C) and any optional components at temperatures above room temperature. Preferably a mixture of components (A)–(C) and any optional components are heated at a temperature above 100° C. A preferred embodiment of the reaction process is to pre-neutralize or otherwise pacify catalytic impurities which are introduced with the raw materials which comprise the adhesive product. The mixing of these components can be enhanced, if desired, by the use of one or more solvents having a boiling point of less than 200° C. in the mixture of step (I), such as benzene, toluene, xylene, naphtha, mineral spirits, cyclic polysiloxanes, or alcohols such as methanol, ethanol, isopropanol, butanol, or n-propanol. The amount of solvent having a boiling point of less than 200° C., if used, ranges from about 60 to 200 parts by weight per 100 parts by weight of components (A)+(B). The mixture of (A)–(C) is generally heated for up to 4 hours at temperatures of from 100° to 180° C., however, the time and temperature are dependent on the selection and concentration of the reaction components. The reaction is essentially complete when the viscosity of the reaction product begins to level off or begins to decrease after achieving a maximum value. The reacting of the mixture of (A)–(C) results in the formation of a reaction product.

When a solvent having a boiling point of less than 200° C. is used, it may be necessary to strip off this solvent after the formation of the reaction product. Methods of stripping volatile components are well known in the art and need no extensive delineation herein. Any method of removing volatile components can be used, such methods exemplified by molecular stills, rotoevaporators, and wipe film evaporators, with the preferred method being rotoevaporators.

It is preferred that the reaction product of step (I) have a solids content of at least 60% and a viscosity of up to 200,000 millipascal-seconds (mPa·s), more preferably has a solids content of at least 75% and a viscosity of up to 150,000 mPa·s, and it is highly preferred that the reaction product of step (I) has a solids content of at least 80% and a viscosity of up to 100,000 mPa·s.

In step (II), component (D) an organic peroxide or azo compound is added to the reaction product of step (I). Examples of preferred organic peroxides which are suitable as component (D) include diacyl peroxides such as benzoyl peroxide or dichlorobenzoyl peroxide. Benzoyl peroxide has been found to be a particularly effective organic peroxide.

Examples of azo compounds suitable as component (D) include azobenzene, azobenzene-p-sulfonic acid, 2,4-dimethyl-4-methoxyvaleronitrile, azobisdimethylvaleronitrile, azobisisobutyronitrile, or azodine, with azobisisobutyronitrile being preferred. Component (D) when added to the product of step (I) can be added as a solution, for example, in an appropriate solvent having a boiling point of less than 200° C. such as benzene, toluene, xylene, naphtha, chlorocarbons, ketones, or mineral spirits.

The amount of Component (D) in the compositions of this invention is preferably from about 0.1 to 5 parts by weight, and more preferably from about 1.5 to 3.5 parts by weight per 100 parts by weight of components (A)+(B).

During or after the formation of the silicone pressure sensitive adhesive composition, small amounts of additional ingredients may be added to the composition so long as they do not materially affect the pressure sensitive adhesive composition. These additional ingredients may be exemplified by, but not limited to, antioxidants, pigments, stabilizers, fillers, and others. It should be apparent to one skilled in the art that a blend of two or more reaction products, each having different amounts of components (A), (B), and (C), can be formed in Step (I), and then this blend can be catalyzed according to Step (II).

This invention further relates to an article of manufacture prepared by (I) applying a silicone pressure sensitive adhesive composition to at least one surface of a substrate, wherein the silicone pressure sensitive adhesive composition is the above described silicone pressure sensitive adhesive composition and (II) heating the silicone pressure sensitive adhesive composition and the substrate to cure the composition. The method can further comprise (III) contacting a solid support with the substrate having the adhesive composition cured thereon after step (II) whereby the solid support and the substrate are adhered together.

The silicone pressure sensitive adhesives of this invention are useful as pressure sensitive adhesives and will readily stick to support a solid support, whether flexible or rigid. These compositions may be applied to a surface by any suitable means such as rolling, spreading, spraying, etc., and cured as described above.

The surface of the support and the substrate to which the support is adhered may be any known solid material such as metals, such as aluminum, silver, copper, iron and their alloys, porous materials such as paper, wood, leather, and fabrics, organic polymeric materials such as polyolefins including polyethylene and polypropylene, fluorocarbon polymers such as polytetrafluoroethylene and polyvinylfluoride, silicone elastomers, silicone resins, polystyrene, polyamides such as Nylon, polyimides, polyesters and acrylic polymers, painted surfaces, siliceous materials such as concrete, bricks, cinderblocks, and glass such as glass cloth. Porous materials such as glass cloth are often impregnated with a substance that will prevent the migration of the silicone pressure sensitive adhesive from one surface to another surface of the support. In this regard, it is also well known to chemically treat, physically treat (for example etching, etc.), or primecoat (adding a curable polysiloxane) the surface of a substrate prior to addition of the silicone PSA to enhance the adhesion of the silicone pressure sensitive adhesive to said surface. The PSA's of the invention are particularly suited to applications wherein good adhesion to a low energy surface (e.g., polyethylene or Teflon™) is desired.

The amount of silicone pressure sensitive adhesive composition to be applied to the surfaces should be sufficient to render the surface definitely tacky to the touch after the removal of any solvent having a boiling point of less than 200° C. After applying it to the surface, the adhesive may be cured by air drying or heating at temperatures of up to 300° C.

Solid supports bearing the cured compositions of this invention are readily adhered to any solid substrate because the silicone pressure sensitive adhesive compositions of this invention have high tack and good adhesive strength.

Useful articles which can be prepared with the silicone pressure sensitive adhesives of this invention include pressure sensitive tapes, labels, emblems and other decorative or informational signs, among others. In particular, the silicone pressure sensitive adhesives are useful in tapes such as a splicing tape in label and paper stock manufacture and converting. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

All parts and percentages are on a weight basis and all measurements were obtained at 25° C. unless otherwise indicated. The molecular weight properties of the polydimethylsiloxane polymers below were determined by Gas Phase Chromatography (GPC) in a toluene solvent, and using a polydimethylsiloxane standard.

The apparatus and testing procedures used for the results shown herein are as follows:

Adhesion was measured by applying a 6×1 inch strip of a Kapton™- or Mylar™-backed adhesive to a clean 2×6 inch stainless steel panel using two passes of a 4.5 lb. rubber-coated roller. The force required to remove the tape from the panel was measured with a Keil Tester at an peel angle of 180° at a rate of 12 inches per minute. The values recorded are the average of multiple readings taken during the course of one pull per sample. The Keil Tester is described in TAPPI, vol. 43, No. 8, pages 164A and 165A (Aug. 1960). The readings are reported in units of ounces per inch (oz/in).

Tack was measured on at least five one-inch squares of the Kapton™ or Mylar™-backed adhesive using a POLYKEN® probe tack tester, available from Testing Machines, Inc., Amityville, N.Y. The tack tester has a 0.5 cm diameter stainless steel probe. The test procedure used a 20 gram weight, a dwell time of 1.0 seconds and a pull speed of 0.5 cm per second. The results reported represent the average of at least five readings, expressed in (g)/cm².

Non-volatile content, i.e. percent solids, of an adhesive material was determined by heating a two gram sample of the material at 150° C. for one hour and expressing the weight of the residue as a percentage of the original sample weight.

The non-volatile content of the MQ resins was determined by mixing about 1.5 grams of resin solution with about 0.75 grams of a polydimethylsiloxane fluid having a viscosity of 100 centistokes (cS) (100 mm²/s), followed by devolatilization at 150° C. for 2 hours.

The resins in the examples were analyzed using $^{29}$Si n.m.r. to determine the molar ratios of the $(CH_3)_3SiO_{1/2}$ units (M) to $SiO_{4/2}$ units (Q) in each resin and to determine the hydroxyl content of each resin.

Viscosities were measured in centipoise (cP) (1 cP=1 millipascal-second (mPa·s)) at room temperature (25°±2° C.) using a Brookfield rotating disc viscometer fitted with an LV-4 spindle.

The following materials were employed in preparing the compositions in the examples:

POLYMER A was a hydroxyl-endblocked polydimethylsiloxane fluid having a viscosity of about 15,000 mPa·s, a number average molecular weight (Mn) of 38,200, and a weight average molecular weight Mw of 68,470.

RESIN A was a benzene-soluble, siloxane resin consisting of $(CH_3)_3SiO_{1/2}$ (M) units and $SiO_{4/2}$ (Q) units and having an M:Q molar ratio of 0.78:1.0, a hydroxyl content of 2.9 wt %, and the following molecular weight characteristics as determined by GPC in Chloroform, using fractionated MQ resin standards and an IR detector, an Mn of 4,300, an Mw of 14,600, and an Mw/Mn of 3.395.

THERMAL STABILITY ADDITIVE was Ten-Cem™ (a dispersion of a neodecanoate salt of a rare earth metal in mineral spirits having 6% active metals in the mineral spirits from Mooney Chemicals, Inc., Cleveland, Ohio).

PEROXIDES:

Perkadox(R) PD-50S-ps-a—a suspension of 50 wt % 2,4-dichlorobenzoyl peroxide in a proprietary polysiloxane fluid supplied by Akzo Chemical.

Benzoyl Peroxide, in granular form, was 98% pure supplied by Aldrich Chemical Company.

EXAMPLE 1

Approximately 150.1 (g) of Resin A, 73.6 (g) of polymer A, 58.3 (g) of toluene, 18 (g) of nonanoic acid, and 0.06 (g) of a thermal stability additive, were combined and thoroughly blended in a three-necked flask equipped with a stirrer, thermometer, condenser, and Dean Stark Trap. This mixture was heated to reflux, and maintained at reflux, for approximately 4 hrs. Water was continuously removed during the reflux step. The reaction product was then stripped at atmospheric pressure to approximately 87% solids, cooled, recovered, and stored for evaluation.

A portion of the adhesive was catalyzed with Perkadox® PD-50S-ps-a at a level of 2 wt % peroxide solids based on PSA solids. The catalyzed PSA mixture was cast onto 2 mil polyester film (Mylar® A), de-volatilized for 2 minutes at 70° C., and finally cured for an additional 2 minutes at 178° C. The thickness of the PSA film was 1.9 mil. The Probe Tack and 180 degree Peel Adhesion were then measured according to the procedures described above. The silicone pressure sensitive adhesive composition had a Peel Adhesion of 42 oz/in and a Probe Tack of 1,089 (g)/cm².

EXAMPLE 2

Approximately 150.1 (g) of Resin A, 73.6 (g) of polymer A, 58.3 (g) of toluene, 18.0 (g) of Armeen®DM12D (dimethyldodecylamine from Akzo Nobel Chemicals, Inc., McCook, Ill.), and 0.06 (g) of a thermal stability additive, were combined and thoroughly blended in a three-necked flask equipped with a stirrer, thermometer, condenser, and Dean Stark Trap. The mixture was heated to reflux, and maintained at reflux, for approximately 4 hrs. Water was continuously removed during the reflux step. The reaction product (adhesive) was then stripped at atmospheric pressure to approximately 87% solids.

A portion of the adhesive was catalyzed with Perkadox® PD-50S-ps-a at a level of 2 wt % peroxide solids based on PSA solids. The catalyzed PSA mixture was cast onto 2 mil polyester film (Mylar® A), de-volatilized for 2 minutes at 70° C., and finally cured for an additional 2 minutes at 178° C. The thickness of the PSA film was 2.0 mil. The probe Tack and 180 degree Peel Adhesion were then measured according to the procedures described above. The Peel Adhesion of this silicone pressure sensitive adhesive composition was >72 oz/in, and the Probe Tack was 1,381 (g)/cm².

EXAMPLE 3

Approximately 150.1 (g) of Resin A, 73.6 (g) of polymer A, 58.3 (g) of toluene, 7.8 (g) of Armeen® DM12D, 10.2 (g) oleic acid, and 0.06 (g) of a thermal stability additive, were combined and thoroughly blended in a three-necked flask equipped with a stirrer, thermometer, condenser, and Dean Stark Trap. The mixture was heated to reflux, and maintained at reflux, for approximately 4 hrs. Water was continuously removed during the reflux step. The reaction product (adhesive) was then stripped at atmospheric pressure to approximately 73% solids.

A portion of the adhesive was catalyzed with Perkadox® PD-50S-ps-a at a level of 2 wt % peroxide solids based on PSA solids. The catalyzed PSA mixture was cast onto 2 mil polyester film (Mylar® A), de-volatilized for 2 minutes at 70° C., and finally cured for an additional 2 minutes at 178° C. The thickness of the PSA film was approximately 1.8 mils. The probe Tack and 180 degree Peel Adhesion were then measured according to the procedures described above. The Peel Adhesion of this silicone pressure sensitive adhesive composition was >72 oz/in, and the Probe Tack was 1,241 (g)/cm².

What is claimed is:

1. A silicone pressure sensitive adhesive composition obtained by a method comprising the steps of
    (I) reacting a mixture comprising:
        (A)(i) at least one hydroxyl-terminated polydiorganosiloxane having a viscosity of from 100 to 100,000,000 mm²/s at 25° C. or
        (ii) a mixture of
            (a) a hydroxyl-terminated polydiorganosiloxane and
            (b) a polydiorganosiloxane selected from
                (i) polydiorganosiloxanes terminated with monovalent hydrocarbon radicals free of aliphatic unsaturation or (ii) alkenyl-terminated polydiorganosiloxanes wherein said mixture has a viscosity of from 100 to 100,000,000 mm²/s at 25° C.;

(B) at least one soluble silicone resin consisting essentially of at least one $R_3SiO_{1/2}$ unit and at least one $SiO_{4/2}$ unit, wherein R is independently selected from a monovalent hydrocarbon or halohydrocarbon radical free of aliphatic unsaturation and having from 1 to 20 carbon atoms, an alkenyl radical, or a hydroxyl radical wherein the molar ratio of $R_3SiO_{1/2}$ units to $SiO_{4/2}$ units is from 0.5:1 to 1.2:1; and (C) at least one solvent or plasticizer selected from the group consisting of carboxylic acids having at least six carbon atoms and having a boiling point of at least 200° C. and amines having at least 9 carbon atoms and having a boiling point of at least 200° C. to form a reaction product; and (II) adding (D) an organic peroxide or azo compound to the reaction product of (I).

2. A composition according to claim 1, wherein the hydroxyl-terminated polydiorganosiloxane is a polydiorganosiloxane having the general formula

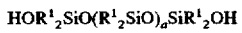

wherein each $R^1$ is independently selected from a monovalent hydrocarbon or halohydrocarbon radical having from 1 to 20 carbon atoms or an alkenyl radical and a has a value such that the viscosity of the polydiorganosiloxane ranges from 1,000 to 500,000 mm²/s when measured at 25° C.

3. A composition according to claim 1, wherein (b)(i) is selected from $Me_3SiO(Me_2SiO)_aSiMe_3$, $Me_3SiO(Me_2SiO)_{0.95a}(MeViSiO)_{0.05a}SiMe_3$, or $Me_3SiO(Me_2SiO)_{0.5a}(MePhSiO)_{0.5a}SiMe_3$ wherein Me, Vi, and Ph denote methyl, vinyl and phenyl, respectively, and a has a value such that the viscosity of the polydiorganosiloxane ranges from 1,000 to 500,000 mm²/s when measured at 25° C.

4. A composition according to claim 1, wherein (b)(ii) is selected from $ViMe_2SiO(Me_2SiO)_aSiMe_2Vi$, $ViMe_2SiO(Me_2SiO)_{0.95a}(MePhSiO)_{0.05a}SiMe_2Vi$, $ViMe_2SiO(Me_2SiO)_{0.98a}(MeViSiO)_{0.02a}SiMe_2Vi$, $PhMeViSiO(Me_2SiO)_aSiPhMeVi$, or $PhMeViSiO(Me_2SiO)_{0.8a}(MePhSiO)_{0.1a}(Ph_2SiO)_{0.1a}SiPhMeVi$, wherein Me, Vi, and Ph denote methyl, vinyl and phenyl, respectively, and a has a value such that the viscosity of the polydiorganosiloxane ranges from 1,000 to 500,000 mm²/s when measured at 25° C.

5. A composition according to claim 1, wherein R is independently selected from methyl, phenyl, vinyl, or hydroxyl, the molar ratio of $R_3SiO_{1/2}$ units to $SiO_{4/2}$ units is from 0.6:1 to 1:1, and (B) has a number average molecular weight of 3,000 to 7,500.

6. A composition according to claim 1, wherein (C) is a carboxylic acid having at least six carbon atoms and having a boiling point of at least 200° C.

7. A composition according to claim 6, wherein the carboxylic acid is selected from the group consisting of nonanoic acid, caproic acid, caprylic acid, oleic acid, linoleic acid, linolenic acid, and N-coco-beta-aminobutyric acid.

8. A composition according to claim 1, wherein (C) is an amine having at least 9 carbon atoms and having a boiling point of at least 200° C.

9. A composition according to claim 8, wherein the amine is selected from the group consisting of dodecylamine, hexadecylamine, octadecylamine, dimethyldodecylamine, dicocoamine, methyldicocoamine, dimethyl cocoamine, dimethyltetradecylamine, dimethylhexadecylamine, dimethyloctadecylamine, dimethyl tallow amine, dimethylsoyaamine, dimethyl nonylamine, di(hydrogenated-tallow)amine, and methyldi(hydrogenated-tallow)amine.

10. A composition according to claim 1, wherein (C) is a combination of a carboxylic acid having at least six carbon atoms and having a boiling point of at least 200° C. and an amine having at least 9 carbon atoms and having a boiling point of at least 200° C.

11. A composition according to claim 1, wherein the mixture of step (I) further comprises (E) at least one solvent or plasticizer having a boiling point of at least 200° C. selected from the group consisting of aliphatic hydrocarbons, glycol ethers, esters, alcohols, ester alcohols, ketones, kerosenes, naphthas, and petrolatums.

12. A composition according to claim 11, wherein (E) is selected from the group consisting of dodecane, tridecane, tetradecane, 1-tetradecene, pentadecane, hexadecane, octadecane, nonadecane, diethylene glycol ethyl ether, diethylene glycol butyl ether, triethylene glycol methyl ether, triethylene glycol ethyl ether, triethylene glycol butyl ether, ethylene glycol phenyl ether, propylene glycol phenyl ether, aromatic based glycol ethers, diethylene glycol butyl ether acetate, pine oil, mineral seal oil, tridecyl alcohol, trimethyl pentane diol isobutyrate, and isophorone.

13. A composition according to claim 1, wherein the mixture of step (I) further comprises a rare earth metal salt of a fatty acid.

14. A composition according to claim 11, wherein the mixture of step (I) further comprises a rare earth metal salt of a fatty acid.

15. A composition according to claim 1, wherein the mixture of step (I) further comprises a solvent having a boiling point of less than 200° C.

16. A composition according to claim 11, wherein the mixture of step (I) further comprises a solvent having a boiling point of less than 200° C.

17. A composition according to claim 13, wherein the mixture of step (I) further comprises a solvent having a boiling point of less than 200° C.

18. A composition according to claim 15, wherein the solvent is selected from benzene, toluene, xylene, alcohols, naphtha, cyclic polysiloxanes, or mineral spirits.

19. A composition according to claim 16, wherein the solvent is selected from benzene, toluene, xylene, alcohols, naphtha, cyclic polysiloxanes, or mineral spirits.

20. A composition according to claim 17, wherein the solvent is selected from benzene, toluene, xylene, alcohols, naphtha, cyclic polysiloxanes, or mineral spirits.

21. A composition according to claim 1, wherein (D) is selected from the group consisting of benzoyl peroxide, dichlorobenzoyl peroxide, 2,4-dimethyl-4-methoxyvaleronitrile, and azobisisobutyronitrile.

22. A composition according to claim 1, wherein the reaction product of step (I) has a solids content of at least 60% and a viscosity of up to 200,000 millipascal-seconds (mPa·s).

23. An article of manufacture obtained by a method comprising
(I) applying a silicone pressure sensitive adhesive composition to at least one surface of a substrate, wherein the silicone pressure sensitive adhesive composition is obtained by a method comprising the steps of
(i) reacting a mixture comprising:
(A)(i) at least one hydroxyl-terminated polydiorganosiloxane having a viscosity of from 100 to 100,000,000 mm²/s at 25° C. or (ii) a mixture of
  (a) a hydroxyl-terminated polydiorganosiloxane and
  (b) a polydiorganosiloxane selected from
    (i) polydiorganosiloxanes terminated with monovalent hydrocarbon radicals free of aliphatic unsaturation or
    (ii) alkenyl-terminated polydiorganosiloxanes wherein said mixture has a viscosity of from 100 to 100,000,000 mm$^2$/s at 25° C.;
(B) at least one soluble silicone resin consisting essentially of at least one $R_3SiO_{1/2}$ unit and at least one $SiO_{4/2}$ unit, wherein R is independently selected from a monovalent hydrocarbon or halohydrocarbon radical free of aliphatic unsaturation and having from 1 to 20 carbon atoms, an alkenyl radical, or a hydroxyl radical wherein the molar ratio of $R_3SiO_{1/2}$ units to $SiO_{4/2}$ units is from 0.5:1 to 1.2:1; and
(C) at least one solvent or plasticizer selected from the group consisting of carboxylic acids having at least six carbon atoms and having a boiling point of at least 200° C. and amines having at least 9 carbon atoms and having a boiling point of at least 200° C. to form a reaction product; and
  (ii) adding (D) an organic peroxide or azo compound to the reaction product of (i); and
(II) heating the silicone pressure sensitive adhesive composition and the substrate to cure the composition.

24. An article of manufacture according to claim 23, wherein the article is further obtained by (III) contacting a solid support with the substrate having the adhesive composition cured thereon after step (II) whereby the solid support and the substrate are adhered together.

25. A article of manufacture according to claim 23, wherein (C) is a carboxylic acid having at least six carbon atoms and having a boiling point of at least 200° C.

26. A article of manufacture according to claim 25, wherein the carboxylic acid is selected from the group consisting of nonanoic acid, caproic acid, caprylic acid, oleic acid, linoleic acid, linolenic acid, and N-coco-beta-aminobutyric acid.

27. A article of manufacture according to claim 23, wherein (C) is an amine having at least 9 carbon atoms and having a boiling point of at least 200° C.

28. A article of manufacture according to claim 27, wherein the amine is selected from the group consisting of dodecylamine, hexadecylamine, octadecylamine, dimethyldodecylamine, dicocoamine, methyldicocoamine, dimethyl cocoamine, dimethyltetradecylamine, dimethylhexadecylamine, dimethyloctadecylamine, dimethyl tallow amine, dimethylsoyaamine, dimethyl nonylamine, di(hydrogenated-tallow)amine, and methyldi(hydrogenated-tallow)amine.

29. A article of manufacture according to claim 23, wherein (C) is a combination of a carboxylic acid having at least six carbon atoms and having a boiling point of at least 200° C. and an amine having at least 9 carbon atoms and having a boiling point of at least 200° C.

30. An article of manufacture according to claim 23, wherein the mixture of step (I) further comprises (E) at least one solvent or plasticizer having a boiling point of at least 200° C. selected from the group consisting of aliphatic hydrocarbons, glycol ethers, esters, alcohols, ester alcohols, ketones, kerosenes, naphthas, and petrolatums.

* * * * *